No. 751,613.

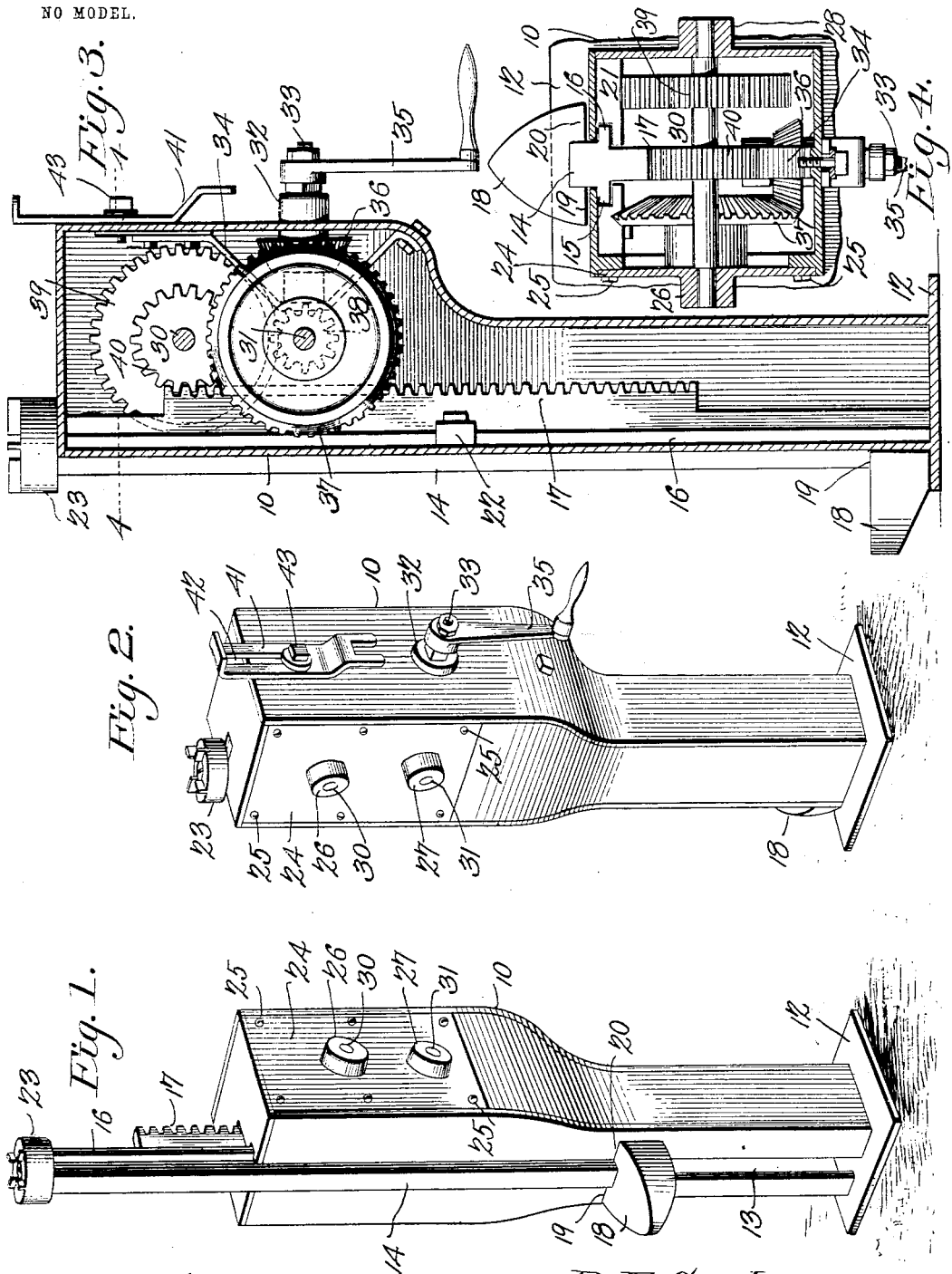

Patented February 9, 1904.

UNITED STATES PATENT OFFICE.

ROBERT F. COOK, OF SAN FRANCISCO, CALIFORNIA.

LIFTING-JACK.

SPECIFICATION forming part of Letters Patent No. 751,613, dated February 9, 1904.

Application filed July 24, 1903. Serial No. 166,871. (No model.)

*To all whom it may concern:*

Be it known that I, ROBERT F. COOK, a citizen of the United States, residing at San Francisco, in the county of San Francisco and State of California, have invented a new and useful Lifting-Jack, of which the following is a specification.

This invention relates to lifting-jacks for elevating relatively heavy bodies, and has for its object to simplify and improve devices of this character and provide a "jack" by which heavy loads may be lifted with the minimum of strain to the parts and wherein the parts are arranged to coactively support each other and wherein the lateral strains and pressure at one side are resisted by a corresponding strain and pressure applied from the opposite side, all as hereinafter shown and described, and specified in the claim.

In the drawings illustrative of the invention, in which corresponding parts are denoted by like designating characters, Figure 1 is a perspective view of the device from the front, and Fig. 2 is a similar view from the rear. Fig. 3 is a vertical sectional view, and Fig. 4 is a transverse section on the line 4 4 of Fig. 3.

The improved device comprises an inclosing casing (indicated as a whole at 10) with extended base 12 and with the upper portion also extended laterally and rearwardly, as shown, to provide for "housing" the lifting-bar-operating parts, as hereinafter shown. The casing will be of metal, preferably of sheet-steel, properly braced and supported and will be provided with a vertical aperture 13 in one side, which for convenience of this description will be referred to as the "front," the aperture also extending through the top of the casing, as shown.

The lifting-bar (represented as a whole at 14) is slidably disposed in the aperture 13 and is provided with lateral longitudinal ribs 15 16, extending from its opposite sides and engaging the inner face of the front member of the casing adjacent to the aperture 13, as shown. The bar member 14 is formed with a gear-rack 17 on its rear or inner face and with a foot member 18 extending from its lower end, the sides of the foot member extending over the outer surface of the front of the casing, as shown at 19 20 in Figs. 1 and 4. The lifting-bar member is further supported by guide-brackets 21 22, attached to the interior of the casing and embracing the ribs 15 16, as shown in Figs. 3 and 4. The upper end of the lifting-bar member extends above the casing and is provided with a swivel-bearing plate or head 23, having radiating spurs, as shown, to receive the pressure when the device is placed beneath a load. By this arrangement it will be obvious that the lifting-bar is efficiently supported and held from all lateral movement centrally of the casing at one side and movable vertically.

The casing is provided with a relatively large opening near the top at one side, provided with a cover member 24, secured in position, as by bolts 25. The cover member is provided with spaced shaft-bearing lugs 26 27, and corresponding bearing-lugs, as 28, are arranged in the opposite side of the casing in alinement with the lugs 26 27, the two sets of lugs adapted to support spaced shafts 30 31, as shown. Centrally of the rear side of the casing 10 is another bearing-lug 32, in which a drive-shaft 33 is mounted for rotation, the inner end of the shaft supported within the casing by a bracket 34 and the outer end provided with an operating-crank 35. The shaft 33 is provided with a bevel-pinion 36, disposed interiorly of the casing and engaging a bevel-gear 37 on the shaft 31 at one side of the center of the casing, the shaft 31 having a gear-pinion 38, engaging a gear-wheel 39 on the shaft 30, as shown, the shaft 30 being also provided with a pinion 40, operatively engaging the rack portion 17, as shown. By this arrangement it will be noted that the lifting-bar member is disposed centrally of the front portion of the casing and the operating-shaft 33 disposed centrally of the opposite or rear side of the casing, while the intervening driving-gears are disposed substantially in equal quantities upon opposite sides of the central line, as shown, so that the power is applied centrally of the casing and the strains and pressures likewise equally disposed upon each side of the center, whereby side strains are eliminated and the parts "balanced." This is an important feature of the invention and adds materially to the efficiency and insures steadiness of action and prevents any tendency to the overturning of the "load" or the twisting or "racking" of the parts by side strains, which are so common in devices of this character as heretofore manufactured. By this simple means the lifting-bar is supported in position and while free to be moved vertically is firmly held from lateral movement in all directions, so that as the gearing is operated by the crank member and the lifting-bar thereby elevated and depressed the guide members firmly support it and prevent any binding action between the rack 17 and operating-pinion 40. The firm supports for the shafts 30 31 also contribute to this end by preventing any movement other than rotary to the shafts.

As many of the brackets 21 22 may be employed as required to give adequate support to the lifting-bar and spaced at suitable distances apart.

The lateral extensions 19 20 of the foot portion 18 are also important features of the invention, as the connection between the parts is thereby greatly strengthened where the greatest strains occur and where fracture is most liable to take place.

The shaft 33 between the crank 35 and bearing-lug 32 is formed square or other than circular and adapted to receive a forked locking-bar 41, having a longitudinal slot 42, in which a clamp-screw 43 operates to hold the lock-bar at any desired position. By this simple means the shaft 33 may be held from rotation when it is desired to hold the lifting-bar and its load at any required point.

The lifting-bar comprising the body portion, foot portion, and rack portion will preferably be in one piece of steel or other metal of sufficient strength to withstand the strains to which it will be subjected and may, together with the other parts, be of any suitable size or strength to adapt it to the work required of it.

Having thus described my invention, what I claim is—

In a device of the class described, an inclosing casing, a lifting-bar centrally disposed at one side of said casing for vertical movement therein and having an integral gear-rack at the inner side, shafts mounted transversely of the casing in the rear of said racked bar, a drive-pinion upon one of said shafts engaging said rack, interengaging gear-wheels carried by said shafts and disposed upon opposite sides of said driving-pinion, and a drive-shaft extending centrally through the rear wall of said casing in alinement with said rack and pinion and carrying a gear adapted to engage said interengaging gears, whereby motion is transmitted to said pinion by power operating centrally of said casing to eliminate lateral strains substantially as described.

In testimony that I claim the foregoing as my own I have hereto affixed my signature in the presence of two witnesses.

ROBERT F. COOK.

Witnesses:
E. J. FRASER,
A. J. HENRY.